US011128347B2

United States Patent
Holweg et al.

(10) Patent No.: US 11,128,347 B2
(45) Date of Patent: Sep. 21, 2021

(54) MEASURING SYSTEM WITH INTERFACE FOR NEAR FIELD COMMUNICATION

(71) Applicant: Infineon Technologies AG, Neubiberg (DE)

(72) Inventors: Gerald Holweg, Graz (AT); Carolin Kollegger, Stallhofen (AT); Johannes Schweighofer, Graz (AT); Inge Siegl, Graz (AT); Christoph Steffan, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/584,083

(22) Filed: Sep. 26, 2019

(65) Prior Publication Data

US 2020/0106484 A1 Apr. 2, 2020

(30) Foreign Application Priority Data

Oct. 1, 2018 (DE) .................... 10 2018 124 182.8

(51) Int. Cl.
*H04B 5/00* (2006.01)
*G08C 17/02* (2006.01)
(Continued)

(52) U.S. Cl.
CPC ........... *H04B 5/0043* (2013.01); *G08C 17/02* (2013.01); *H04B 1/59* (2013.01); *H04B 5/0031* (2013.01); *H04W 4/80* (2018.02)

(58) Field of Classification Search
CPC ...... H04B 5/0043; H04B 1/59; H04B 5/0031; H04W 4/80; G08C 17/02
(Continued)

(56) References Cited

U.S. PATENT DOCUMENTS 9,621,227 B2 * 4/2017 Dobyns ................. H04L 63/107
9,955,289 B1 * 4/2018 Liu ........................ A61N 1/37229
(Continued)

FOREIGN PATENT DOCUMENTS

DE 102017203195 B3 8/2018
EP 000001824689 B1 4/2012

OTHER PUBLICATIONS

Office Action, EP 10 2018 124 182.8, dated Jul. 15, 2019, pp. 11.

*Primary Examiner* — April G Gonzales
(74) *Attorney, Agent, or Firm* — Armis IP Law, LLC

(57) ABSTRACT

This disclosure includes a measuring device and a corresponding method. According to an exemplary embodiment, the measuring device comprises the following: a measuring circuit connected to one or more sensors; an RF frontend for near field communication (NFC) with an external device; a controller circuit coupled to the RF frontend and the measuring circuit and operative to receive measured values supplied from the measuring circuit, and wherein the controller circuit is further operative to check whether active communication with the external device occurs during a measurement and to store or discard one or more measured values supplied from the measuring circuit depending on this check. It is checked whether an NFC magnetic field is present during the measurement. Further configurations include a system comprising a measuring device and an NFC-enabled device.

30 Claims, 5 Drawing Sheets

(51) Int. Cl.
*H04B 1/59* (2006.01)
*H04W 4/80* (2018.01)

(58) Field of Classification Search
USPC ........................................................ 455/41.1
See application file for complete search history.

(56) References Cited

U.S. PATENT DOCUMENTS

| | | | |
|---|---|---|---|
| 9,985,732 B2* | 5/2018 | Cordier | G06K 7/0095 |
| 10,346,732 B2* | 7/2019 | Philip | G06K 19/0712 |
| 10,425,173 B2* | 9/2019 | Cordier | H04B 5/0031 |
| 10,511,347 B2* | 12/2019 | Hueber | H04B 5/0031 |
| 2017/0026723 A1* | 1/2017 | Wan | H04B 5/0056 |
| 2017/0163357 A1* | 6/2017 | Cordier | G06K 7/10237 |
| 2018/0165560 A1* | 6/2018 | Philip | H04B 5/02 |
| 2018/0269997 A1* | 9/2018 | Cordier | G06K 7/10237 |
| 2019/0149196 A1* | 5/2019 | Hueber | H03B 5/06 340/10.1 |

* cited by examiner

MEASURING SYSTEM WITH INTERFACE FOR NEAR FIELD COMMUNICATION

This application is related to and claims priority to earlier filed Germany filed patent application serial number DE 10 2018 124581.5 entitled "MEASURING SYSTEM WITH INTERFACE FOR NEAR FIELD COMMUNICATION," filed on Oct. 5, 2018, the entire teachings of which are incorporated herein by this reference.

TECHNICAL FIELD

This description concerns the field of measurement technology, in particular an integrated measuring system with an interface for wireless data transmission via near field communication (NFC).

BACKGROUND

Near Field Communication (NFC) is an international transmission standard based on RFID technology for the non-contact exchange of data using electromagnetically coupled coils over relatively short distances (e.g. a few centimeters) and a data transmission rate of currently a maximum of 424 kBit/s. Up until now, this technology has primarily been used in the field of micropayments (cashless payments of small amounts) and access control. Further applications are, for example, the transmission of authentication data to establish communication via a Bluetooth or WLAN connection, for example, as well as the calling of web links if a URL (Uniform Resource Locator) of a website is stored in an NFC chip. NFC is standardized in ISO/IEC 18092 (Near Field Communication Interface and Protocol-1) and ISO/IEC 21481 (Near Field Communication Interface and Protocol-2).

Regarding the payment function mentioned above, many modern mobile devices such as smartphones are equipped with NFC transceivers (NFC Reader/Writer). Such devices are referred to as NFC-enabled mobile devices. An NFC chip—often also referred to as an NFC tag or NFC transponder—usually has no energy supply of its own and is powered by the electromagnetic field generated by an NFC-enabled mobile device. This means that energy is transmitted from the NFC-enabled mobile device to the NFC chip, whereas data transmission in both directions is possible. Currently available NFC-enabled devices usually operate with a fixed transmission power and do not allow power control. The set transmission power can vary greatly depending on the type and manufacturer of the NFC-enabled device. For example, there are NFC-enabled smartphones that work with approximately ten times the NFC transmission power of other smartphones.

The antennas of NFC-enabled devices and NFC chips (NFC transponders) are strictly speaking simple conductor loops. In the respective antenna circuits, these conductor loops represent an inductance which, together with corresponding capacitances, form parallel resonant circuits. For efficient energy transmission from an NFC-enabled device to an NFC chip, the antenna circuits are typically operated at the same resonant frequency, maximizing the inductive coupling and induced voltage. For standard applications, this resonant frequency is usually 13.56 MHz.

The electromagnetic power emitted by the NFC-enabled device is of course not transmitted one hundred percent to the NFC chip. The electromagnetic radiation of the NFC-enabled device can cause interference in the NFC chip as well as in adjacent components, conductor paths, etc. due to induced voltages. In many (e.g. purely digital) applications such interference is not a problem, but there are also applications, such as sensor devices equipped with NFC chips, in which the mentioned interference can cause problems.

SUMMARY

In the following a measuring device is described, which comprises the following according to an exemplary embodiment: a measuring circuit connected to one or more sensors; an RF frontend for near field communication (NFC) with an external device; a controller circuit coupled to the RF frontend and the measuring circuit and operative to receive measured values supplied from the measuring circuit, and wherein the controller circuit is further operative to check (determine) whether active communication with the external device occurs during a measurement and to store or discard one or more measured values supplied from the measuring circuit depending on this check.

In another exemplary embodiment, the measuring device comprises a measuring circuit connected to one or more sensors, an RF frontend for near field communication with an external device coupled to the RF frontend via an NFC magnetic field, and a controller circuit coupled to the RF frontend and the measuring circuit and operative to receive measured values supplied from the measuring circuit. The controller circuit is further operative to check whether the NFC magnetic field is present during a measurement and to store or discard one or more measured values supplied from the measuring circuit depending on this check.

A method is further described comprising, according to an exemplary embodiment: establishing an NFC connection between an NFC-enabled device and an NFC frontend of a measuring device having a measuring circuit coupled to one or more sensors; performing a measurement, wherein a plurality of measured values are supplied from the measuring circuit; checking whether active communication occurs during the measurement via the NFC connection; and storing or discarding one or more of the measured values depending on the result of the check.

According to another exemplary embodiment, the method comprises establishing an NFC connection between an NFC-enabled device and an NFC frontend of a measuring device having a measuring circuit coupled to one or more sensors. The NFC connection is established by means of an NFC magnetic field. The method also comprises carrying out a measurement, wherein a plurality of measured values are supplied from the measuring circuit. Finally, it is checked whether the NFC magnetic field is present during the measurement, whereby one or more of the measured values are stored or discarded depending on the result of the check.

Another exemplary embodiment concerns a system with an NFC-enabled device operative to generate an NFC magnetic field for near field communication (NFC) and a measuring device with a chip comprising an RF frontend, a measuring circuit and a controller circuit. The RF frontend is coupled to the NFC-enabled device via the NFC magnetic field, and the controller circuit is operative to transmit a request to the NFC-enabled device to temporarily switch off the NFC magnetic field prior to a measurement.

BRIEF DESCRIPTION OF THE DRAWINGS

In the following, different exemplary embodiments are explained in more detail using illustrations. The presentations are not necessarily true to scale, and the exemplary embodiments are not only limited to the aspects presented. Rather, emphasis is placed on presenting the principles underlying the exemplary embodiments. In the illustrations.

DETAILED DESCRIPTION

Figure 1:
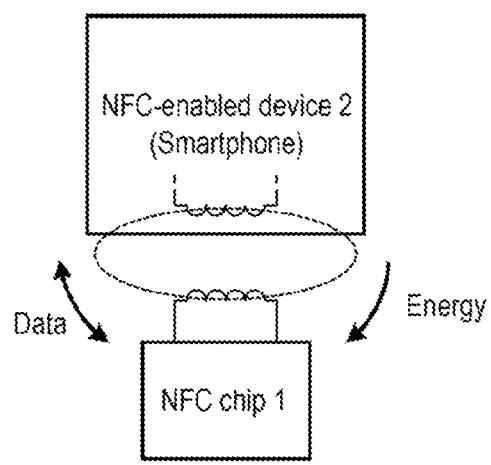
FIG. 1 illustrates the coupling of an NFC chip to an NFC-enabled device such as a smartphone or similar according to embodiments herein.

As mentioned at the outset, near field communication (NFC) is a standard for energy and data transmission between an NFC-enabled device 2 for example a tablet computer or smartphone and an NFC chip 1. This situation is presented in FIG. 1. NFC is usually used not only for (bidirectional) data transmission, but also for (unidirectional) energy supply of the NFC chip 1 by the NFC-enabled device 2. The antennas of NFC chip 1 and the NFC-enabled device 2 are usually designed as conductor loops (i.e. flat coils), and data and energy transmission are based on the inductive coupling of the two antennas.

NFC chips can be used in various applications. NFC is mainly used for authentication, for example in connection with payment systems (e.g. micropayment) or access control systems. A relatively new application is the coupling of sensor devices to an NFC-enabled mobile device such as a smartphone via near field communication. The sensor device comprises one or more sensors, the associated sensor electronics and an RFID frontend (radio-frequency (RF) frontend circuit) for near field communication with the mobile device. The mobile device can be used in a measurement application, for example, to further process measurement data transmitted by NFC from the sensor electronics to the mobile device and present it on a screen of the mobile device. In addition, the mobile device can accept user inputs and transmit them to the sensor electronics via NFC. In this way, the mobile device can serve as a human-machine interface for the sensor electronics. An example of a device with a sensor coupled to a mobile device via NFC is presented in FIG. 2.

Figure 2:
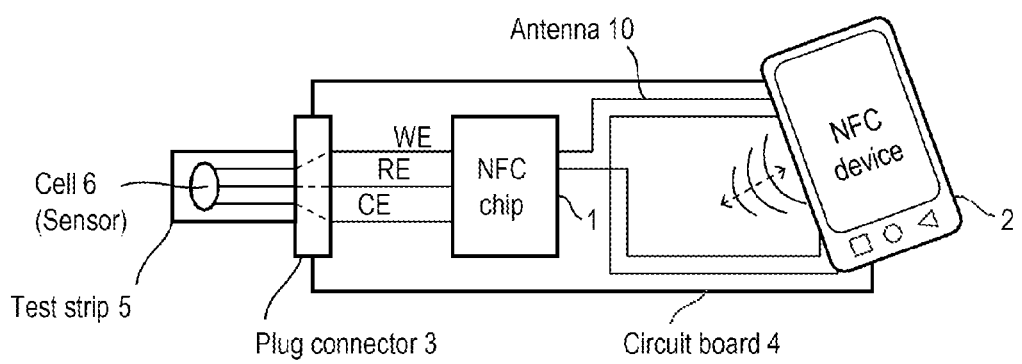
FIG. 2 illustrates an example of a measurement assembly comprising a sensor device comprising an electrochemical cell and an NFC chip, and an NFC-enabled device according to embodiments herein.

FIG. 2 illustrates, as an example of a sensor device, a device with a biochemical sensor and integrated sensor electronics, which include an interface for near field communication (NFC) in order to be able to transmit measurement data to an NFC-enabled mobile device 2. In the example presented in FIG. 2, the NFC chip 1 includes both the mentioned sensor electronics and the NFC interface. The energy supply for the NFC chip can also be via NFC. The sensor device according to FIG. 2 comprises a circuit board 4 on which the NFC chip 1 and an antenna 10 are arranged. As mentioned above, the antenna 10 can essentially be a conductor loop (i.e. a flat coil) formed on the circuit board by means of strip lines. A plug connector 3 is arranged on the circuit board 4 as shown in FIG. 2, which makes it possible to connect an electrochemical cell 6 (which forms the sensor) arranged on a test strip 5 to the circuit board. The electrodes of the electrochemical cell 6 marked WE, RE and CE in FIG. 2 are connected to the NFC chip 1 via the plug connector 3 and strip lines arranged on the circuit board. As mentioned above, the NFC chip 1 contains the sensor electronics for controlling the cell 6 and for acquiring and processing the sensor signals, as well as the circuits required for near field communication. The electrochemical cell 6 can be used, for example, for voltammetry or similar techniques to quantitatively determine one or more substances (analyte) contained in the electrolyte of the electrochemical cell. The necessary control of the electrodes WE, RE and CE is done by the sensor electronics contained in the NFC chip 1. The test strip 5 and the plug connector 3 can be omitted if the electrochemical cell 6 is arranged directly on the circuit board 4.

Sensor devices such as the example shown in FIG. 2 are known per se, for example for measuring the potassium concentration in blood (see e.g. Kollegger, C., Greiner, P., Siegl, I. et al., *Intelligent NFC potassium measurement strip with hemolysis check in capillary blood*, in: Elektrotech. Inftech. (2018) 135/1, pages 83-88, https://doi.org/10.1007/s00502-017-0572-5). A drop of blood forms the electrolyte of the electrochemical cell, which is operated as a potentiostat to determine the concentration of potassium in the blood. A potentiostat can be used, for example, for cyclic voltammetry (CV), by means of which the chemical composition of mixtures of substances can be determined based on the voltage-dependent current curve in the electrochemical cell. Voltammetry is a form of electrolysis in which the dependence of an electrode current on a voltage applied to an electrochemical cell is determined. The further analysis of the sample includes the evaluation of the measured current-voltage curves, for example to determine the concentration of an analyte contained in the sample (e.g. certain metal ions). This evaluation and the presentation of the measurement results can be done at least partially by the mobile device 2. In particular, the CPU (not shown) contained in the mobile device can be used to execute software applications operative to carry out the aforementioned evaluation of the (digitized) measurement data and to present the results.

It goes without saying that the electrochemical cell 6 is only an illustrative example of a sensor that can be operated in conjunction with an NFC chip. In addition, the sensor electronics contained in the NFC chip can also implement other measurement methods such as impedance spectroscopy instead of the voltammetry mentioned above.

As mentioned, the NFC chip 1 can also be powered by means of NFC. The NFC chip (and the sensor device as a whole) therefore does not necessarily need its own energy supply. However, wireless data and energy transmission can also interfere with the measurement performed by the sensor by RF signal components interfering with the sensor signals and/or the excitation signals for the sensor, or otherwise interfering with the sensor electronics. The RF signal components usually have a frequency that corresponds to the frequency of the RF carrier signal used in NFC (e.g. 13.56 MHz). Since in practice the entire sensor device is exposed to the electromagnetic radiation generated by the NFC-enabled device, interference signals can be induced in virtually any electrical component of the sensor device, which can affect the operation of the sensor. A shielding of the electromagnetic radiation is practically not possible or would be at least very complex. Especially with electrochemical sensors, the induced interference signals can influence the electrochemical processes in the electrochemical cell, and these undesired effects cannot subsequently be eliminated by digital or analog signal processing.

Figure 3:
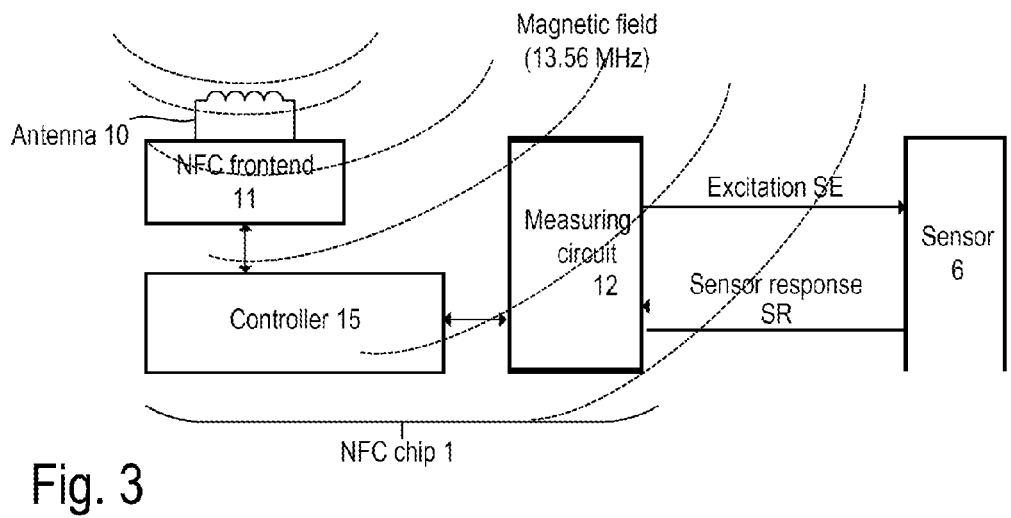
FIG. 3 illustrates an example of the sensor device from FIG. 2 using a block diagram according to embodiments herein.

FIG. 3 illustrates the structure of the sensor device and in particular of the NFC chip 1 from FIG. 2 in more detail using a block diagram. According to FIG. 3, the sensor device has an antenna 10 for near field communication (NFC) that is operative to receive an RF signal from an external NFC-enabled device (see FIG. 2, mobile device 2). The sensor device also has an NFC frontend 11 connected to the antenna 10 with an NFC transceiver that serves as a communication interface. The sensor device also has a controller 15 connected to the NFC frontend, which is operative to communicate with the NFC-enabled device (e.g. a smartphone) via the NFC frontend 11. The controller can be for example a micro-controller. It may have a memory and a processor operative to execute software instructions contained in the memory. This means that the functions provided by the controller 15 can at least partially be implemented using software. For example, the controller 15 can also have one or more analog-to-digital converters to digitize measurement signals.

According to FIG. 3, the sensor device has a measuring circuit 12 which is connected on the one hand to the controller 15 and on the other hand to the sensor 6 (e.g. the electrochemical cell). Measuring circuit 12 is operative to generate an excitation signal SE and to feed it to the sensor 6 and to receive a response signal SR from the sensor 6 and to pre-process (e.g. amplify) it. Depending on the type of sensor, the excitation signal SE can be different. For example, the excitation signal SE can be a DC voltage supplying the sensor. In cyclic voltammetry, the excitation signal SE can be an AC voltage with a defined signal form. In some exemplary embodiments, several signals can be used for excitation of the sensor. Furthermore, several sensor response signals can also be supplied by the sensor. Finally, several sensors can also be connected to the measuring circuit, which can be operated simultaneously or one after the other.

The pre-processed sensor signals (response signals) can be fed to the controller 15, which digitizes these sensor signals and digitally further processes the information contained therein (sensor information) and/or transmits it via the NFC communication interface to the NFC-enabled device. Also presented in FIG. 3 is the electromagnetic field generated by the NFC-enabled device 2 (not shown in FIG. 3) (see dotted lines), which can penetrate and impair the entire sensor device. In some examples, the RF carrier signal of near field communication (i.e. the NFC magnetic field as such) is less of a problem than the modulation of the RF carrier signal that occurs when data is actively transmitted via the NFC transmission channel.

Figure 4:
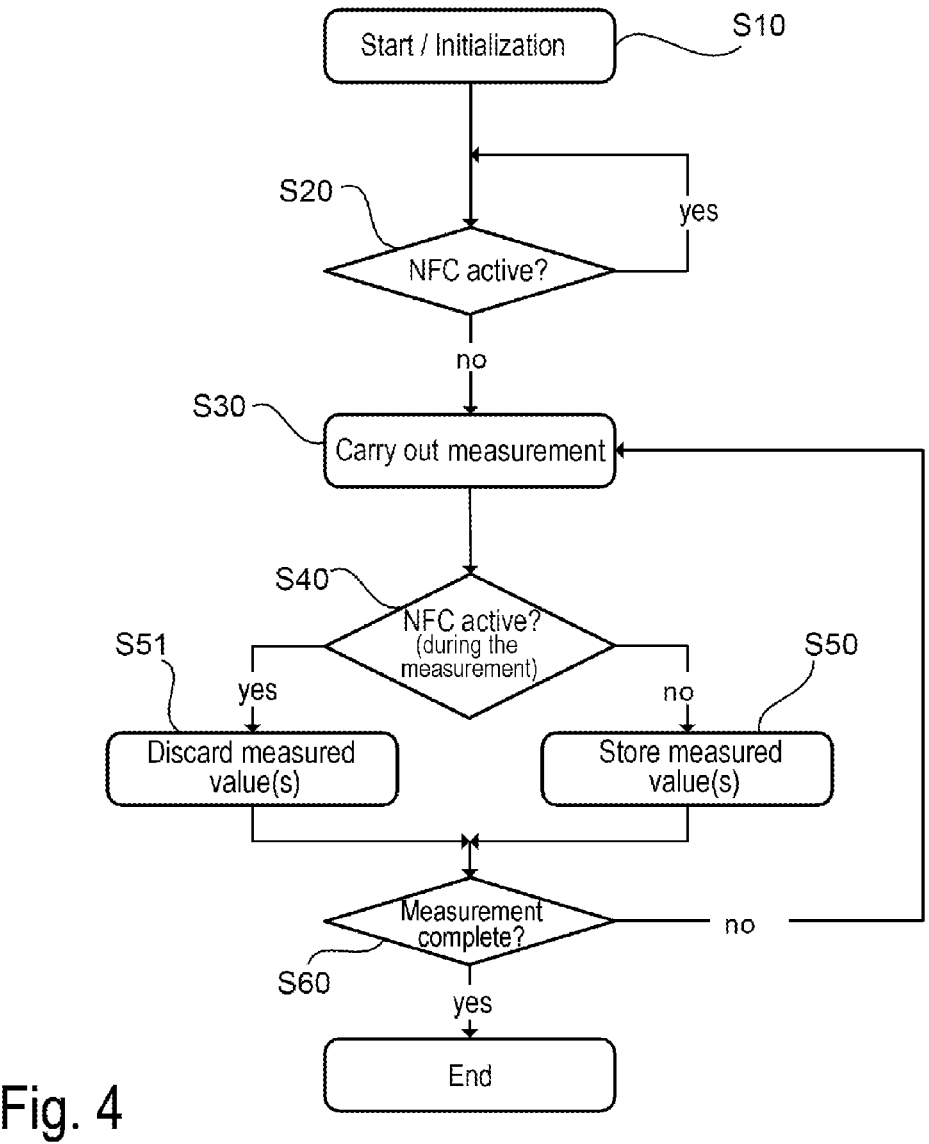
FIG. 4 illustrates an example of a method for operating a sensor device in which during a measurement it is checked whether communication takes place via the NFC transmission channel (i.e. the modulation of the NFC magnetic field) according to embodiments herein.

FIG. 4 illustrates an example of a method for operating the sensor device from FIG. 3, where during a measurement it is checked whether communication takes place via the NFC transmission channel. With active data transmission via the NFC transmission channel, the high-frequency magnetic field, i.e. the RF carrier signal (e.g. 13.56 MHz, see FIG. 3), is modulated, whereby with NFC amplitude shift keying (ASK) or binary phase shift keying (BPSK) is usually used to modulate the RF carrier signal.

According to FIG. 4, after starting the procedure (FIG. 4, step S10), it is checked whether active communication takes place via the NFC transmission channel (FIG. 4, step S20). Active communication means that the high-frequency NFC magnetic field is modulated. If there is no active communication, the high-frequency NFC magnetic field (i.e. the RF carrier signal) may still be present to power the NFC chip, but without modulating the RF carrier signal. If it is determined that active communication is no longer taking place, the measurement can be carried out (FIG. 4, step S30), i.e. the sensor is excited and the sensor response is processed to generate one or more measured values (see FIG. 3, signals SE and SR). At the same time, it can be continuously checked whether communication via the NFC transmission channel is (still) inactive (FIG. 4, step S40). If communication was inactive during the measurement, the (digitized) measured values can be stored temporarily (FIG. 4, step S50). If communication via the NFC channel was initiated during the measurement, the measured values are discarded (FIG. 4, step S51). The process (i.e. the implementation of the measurement) is repeated until the measurement is completed (FIG. 4, step S60).

With the method presented in FIG. 4 it can be achieved that measured values which have been disturbed by modulations of the NFC magnetic field are not used but discarded. The method can be carried out at least partially by means of software executed by the controller 15. In particular, the controller 15 can carry out the sequence control of the method and in particular also check whether communication via the NFC channel has taken place during the acquisition of sensor signals (see FIG. 4, step 40).

Figure 5:
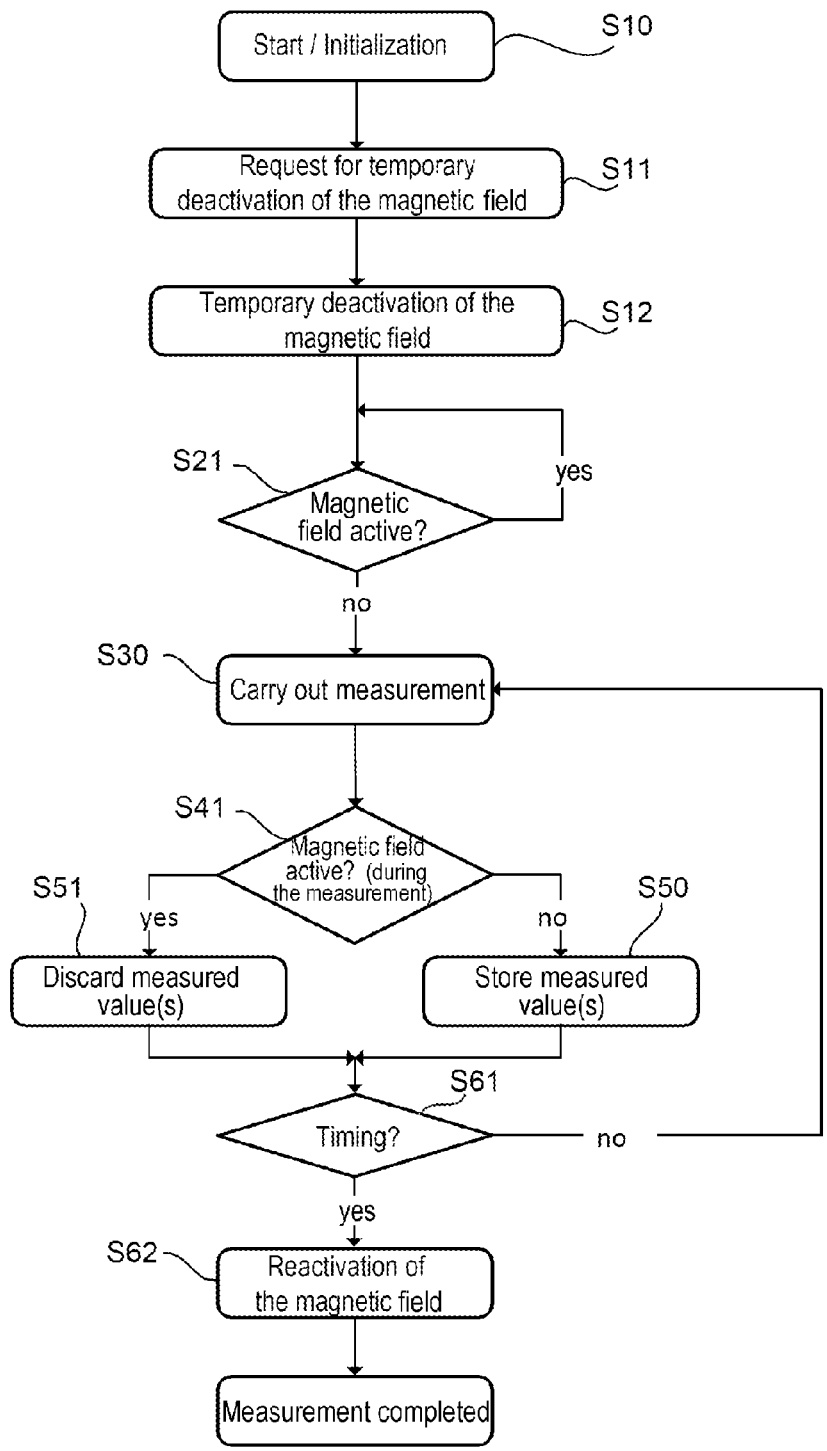
FIG. 5 illustrates another example of a method of operating a sensor device by deactivating the NFC magnetic field during a measurement according to embodiments herein.

FIG. 5 illustrates another example of a method of operating a sensor device using a flowchart, whereby the NFC magnetic field is deactivated during a measurement. This means that not only the communication (the modulation of the magnetic field) is paused, but also the high-frequency magnetic field (the RF carrier signal) is switched off.

According to FIG. 5, after starting the procedure (FIG. 5, step S10), a request (see FIG. 5, step S11) is sent via the NFC transmission channel from the NFC chip 1 to the NFC-enabled mobile device (see FIG. 2) to switch off the high-frequency NFC magnetic field. The sending of the request can be initiated by the controller 15 of the NFC chip 1 (see FIG. 3). Alternatively, the request for example can be entered directly by the user into the NFC-enabled mobile device 2 (e.g. via a touch screen of the NFC-enabled mobile device). In response to the request, the NFC-enabled mobile device 2 can switch off the high-frequency magnetic field (i.e. the RF carrier signal). This of course means that the NFC chip 1 and any peripheral components connected to it are no longer actively powered via the NFC magnetic field. For this reason, in this exemplary embodiment the NFC chip 1 is connected to an energy storage device which can temporarily guarantee the energy supply while the NFC magnetic field is switched off. In one exemplary embodiment, the energy storage device is a capacitor that is connected to or integrated into the NFC chip 1. In another exemplary embodiment, the energy storage device may be a rechargeable battery.

When the NFC magnetic field is switched off, the measurement can be performed using the sensor connected to the NFC chip without the sensor signals being disturbed by the NFC magnetic field. (FIG. 5, step S30). Nevertheless, an exemplary embodiment can also be used to continuously check during the measurement whether the magnetic field is still switched off (FIG. 5, step 41). If so, the (digitized) measured values can be saved (FIG. 5, step S50). If the NFC magnetic field (for whatever reason) is reactivated during the measurement, the measured values are discarded (FIG. 5, step S51).

In the example described here, the NFC magnetic field is deactivated for a specified, predetermined time, which may correspond to any time required for a typical measurement. When this time has expired (FIG. 5, step 61), the NFC magnetic field is reactivated by the NFC-enabled mobile device (FIG. 5, step 62). The method presented in FIG. 5 can be repeated as often as desired. For example, if the capacitor for buffering the energy supply is to be kept small, it may be necessary to interrupt the measurement several times to recharge the capacitor (with current drawn from the NFC magnetic field).

Figure 6:
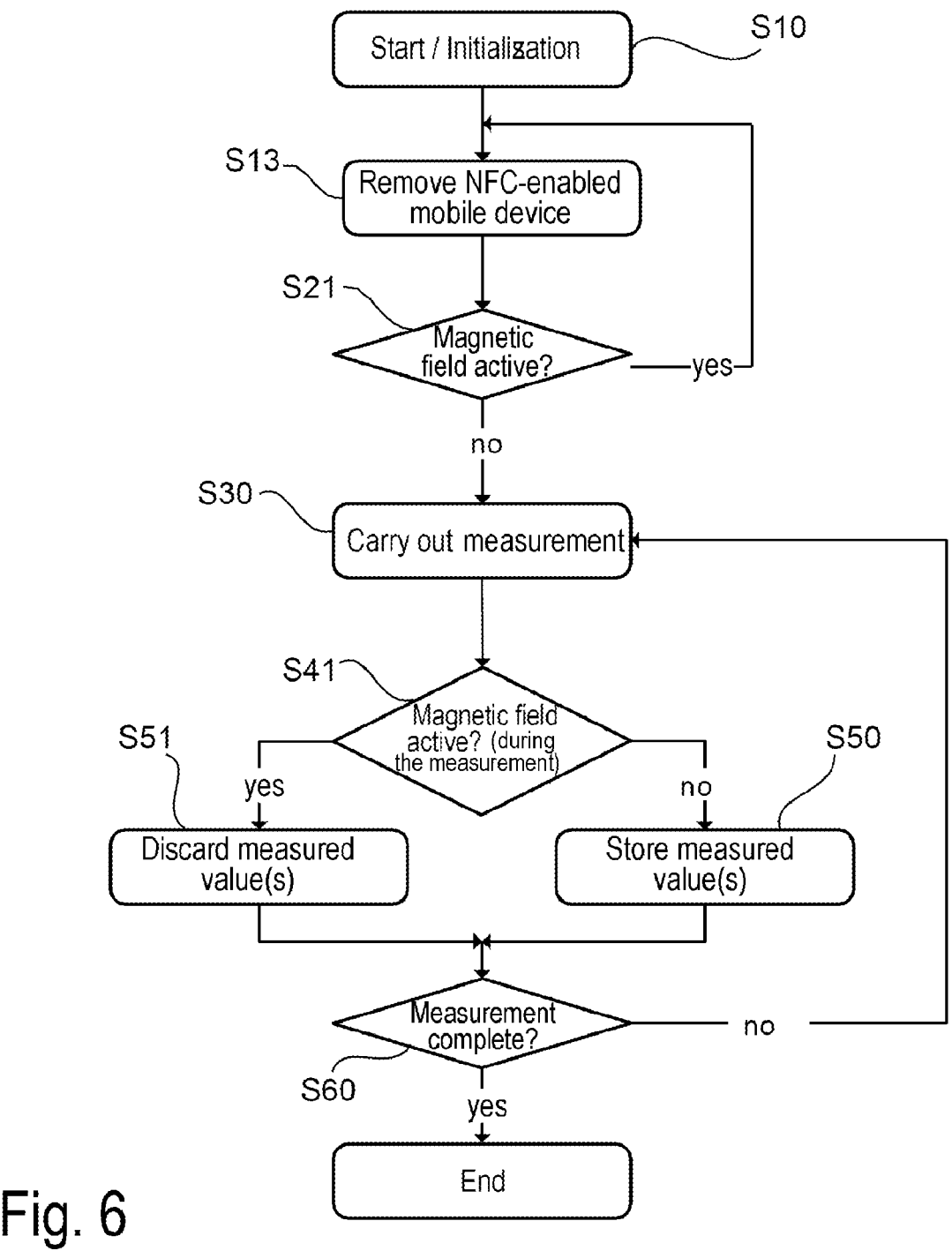
FIG. 6 illustrates another example of a method of operating a sensor device where, during measurement, the NFC-enabled mobile device is spatially separated from the sensor device according to embodiments herein.

FIG. 6 illustrates an example of a method that is an alternative to the method in FIG. 5. According to FIG. 6, after the start of the method (FIG. 6, step S10), the NFC-enabled mobile device 2 (see FIG. 2) is removed by the user and thus spatially separated from the NFC chip 1 (FIG. 6, step S13), so that the NFC chip 1 is out of range of the near field communication. The controller 15 of the NFC chip 1 continuously checks whether the NFC magnetic field is still present (FIG. 6, step S21). The removal of the NFC-enabled mobile device 2 is detected if the NFC frontend 11 of the NFC chip 1 no longer receives an NFC magnetic field with sufficient field strength. Subsequently, the measurement can be carried out (FIG. 6, step S30), i.e. the sensor is excited, and the sensor response is processed to generate one or more measured values (see FIG. 3, signals SE and SR). At the same time, it can be continuously checked whether the NFC magnetic field is (still) switched off (FIG. 6, step S41). If the NFC magnetic field is (again) detected during the measurement, the (digitized) measured values can be discarded (FIG. 6, step S51), otherwise the measured values can be saved (FIG. 6, step S50). The process (i.e. the implementation of the measurement) is repeated until the measurement is completed (FIG. 6, step S60). The user can then bring the NFC-enabled mobile device back into the vicinity of the NFC chip 1 to enable communication again.

In this example, as in the previous example from FIG. 5, an energy storage device is required because no energy supply is possible from the NFC-enabled mobile device during the measurement. During the initialization (FIG. 6, step 1) of the measurement process, the NFC-enabled mobile device 2 can, for example, use a message shown on a display or an acoustic signal to inform the user that the NFC-enabled mobile device 2 is to be removed from the NFC chip 1. After a predetermined period of time, which is usually required for a measurement, the NFC-enabled mobile device 2 can inform the user (e.g. via an acoustic signal) that the NFC-enabled mobile device 2 is to be brought back into the vicinity of the NFC chip 1 in order to enable communication again.

Figure 7:
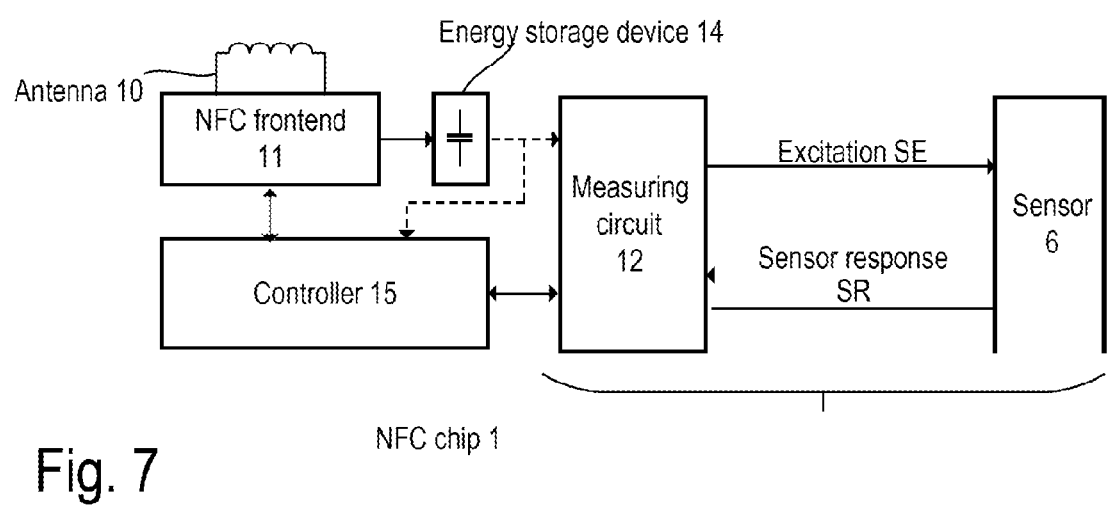
FIG. 7 illustrates the example from FIG. 3 with an additional energy storage device for buffering the energy supply according to embodiments herein.

FIG. 7 illustrates the example from FIG. 3 with an additional energy storage device 14 for buffering the energy supply during phases in which a direct energy supply by the NFC magnetic field is not possible. These phases relate to the time periods in which the user has removed the NFC-enabled mobile device 2 (see FIG. 6) or the NFC-enabled mobile device 2 has temporarily switched off the NFC magnetic field (see FIG. 5). In the example shown in FIG. 7, the energy storage device 14 is part of the NFC chip 1. As already mentioned, the energy storage device 14 can also be a separate circuit component connected to the NFC chip 1. Otherwise, the example from FIG. 7 is the same as the example from FIG. 3 and reference is made to the above description.

We claim:

1. A measuring device comprising:
   a measuring circuit connected to a sensor;
   an RF frontend implementing near field communications to communicate with an external device;
   a controller circuit coupled to the RF frontend and the measuring circuit, the RF frontend operative to receive measured values supplied from the measuring circuit; and
   wherein the controller circuit is further operative to: i) monitor whether active data communication with the external device occurs via the near field communications during a measurement of the measuring circuit producing the measured values; and ii) selectively store each of the received measured values supplied from the measuring circuit depending on detection of the active data communication via the near field communications during the measurement.

2. The measuring device as in claim 1, wherein the controller circuit is further operative to: i) check, before starting the measurement via the measuring circuit, whether the active data communication is currently occurring with the external device, and ii) initiate a respective measurement via the measuring circuit only when no active communications are occurring between the RF frontend and the external device.

3. The measuring device as in claim 1, wherein the RF frontend is coupled to the external device via a near field communication magnetic field; and
   wherein the RF frontend is operative to provide a supply voltage to the measuring circuit and the controller circuit based on conversion of the near field communication magnetic field into the supply voltage.

4. The measuring device as in claim 3 further comprising:
   an energy storage device to store the supply voltage, the energy storage device operative to provide the supply voltage to the measuring circuit and the controller circuit during conditions in which the measuring circuit produces the measured values associated with the sensor.

5. The measuring device as in claim 1, wherein the near field communications is conveyed via a wireless carrier signal; and
   wherein the active data communication includes modulation of data onto the wireless carrier signal.

6. The measuring device as in claim 5, wherein the external device modulates the data onto the near field communications.

7. The measuring device as in claim 5, wherein the RF frontend is operative to modulate the data onto the wireless carrier signal.

8. The measuring device as in claim 1, wherein the controller circuit is operative to discard the measured values generated by the measuring circuit in response to detection of the active data communication over the near field communications.

9. The measuring device as in claim 1, wherein the controller circuit is operative to store the measured values generated by the measuring circuit in response to not detecting presence of the active data communication over the near field communications.

10. The measuring device as in claim 9, wherein the RF frontend is operative to power the measuring circuit via a supply voltage derived from the near field communications during a condition in which the near field communications is absent.

11. The measuring device as in claim 1, wherein the measuring circuit is operative to produce the measured values based on monitoring of an output of the sensor.

12. The measuring device as in claim 1, wherein the RF frontend is operative to notify the external device to terminate generation of the near field communications for a predetermined time to accommodate execution of the measurement.

13. The measuring device as in claim 1, wherein the RF frontend is operative to notify the external device to be removed from a vicinity of the measuring device to accommodate execution of the measurement.

14. A measuring device comprising:
 a measuring circuit connected to a sensor;
 an RF frontend in communication with an external device via a near field communication magnetic field;
 a controller circuit coupled to the RF frontend and the measuring circuit, the controller circuit operative to receive measured values from the measuring circuit; and
 wherein the controller circuit is further operative to: i) determine times in which the near field communication magnetic field is present during a measurement by the measuring circuit, and ii) selectively store the measured values received from the measuring circuit depending on a timing of the measuring circuit producing the measured values.

15. The measuring device as in claim 14, wherein the controller circuit is operative to send a request via the near field communication magnetic field to the external device, the request notifying the external device to temporarily discontinue transmitting a near field communication magnetic field for a predetermined period of time.

16. The measuring device as in claim 15 further comprising:
 an energy storage device operative to buffer a supply voltage for the measuring circuit and the controller circuit.

17. The measuring device as in claim 16, wherein the RF frontend is operative to provide the supply voltage to the measuring circuit and the controller circuit, the supply voltage generated from energy received from the near field communication magnetic field.

18. The measuring device as in claim 14, wherein the controller circuit is further operative to discard the measured values in response to detection of the near field communication magnetic field during the measurement.

19. The measuring device as in claim 14, wherein the controller circuit is further operative to store the measured values in response to detecting absence of the near field communication magnetic field during the measurement.

20. The measuring device as in claim 14, wherein the RF frontend is operative to communicate the measured values to the external device over the near field communication magnetic field.

21. A method comprising:
 establishing a near field communication connection between a communication device and a near field communication frontend of a measuring device having a measuring circuit coupled to a sensor;
 via the measuring device, performing a measurement, the measurement including a plurality of measured values supplied from the measuring circuit;
 monitoring for presence of active communications over the near field connection during the measurement; and
 selectively storing each of the measured values depending on the occurrence of the active communications.

22. The method as in claim 21, wherein a start of a measurement via the measuring circuit is delayed until the active communications via the near field communication connection are terminated.

23. The method as in claim 22 further comprising:
 via the active near field communications transmitted over the near field communication connection, generating a supply voltage to power the measuring circuit.

24. A method comprising:
 establishing a near field communication connection between a communication device and a near field communication frontend of a measuring device having a measuring circuit coupled to a sensor, the near field communication connection being established via a near field communication magnetic field;
 carrying out a measurement in which a plurality of measured values are supplied from the measuring circuit to the communication device over the near field communication connection;
 monitoring for presence of the near field communication magnetic field during the measurement; and
 selectively storing each of the measured values depending on a result of the of the near field communication magnetic field being present during the measurement.

25. The method as in claim 24 further comprising:
 transmitting a request to switch off the near field communication magnetic field via the near field communication connection to the communication device;
 temporarily switching off the near field communication magnetic field for a predetermined period of time.

26. The method as in claim 24 further comprising:
 issuing a message to the communication device, the message indicating to terminate the near field communication connection between the communication device and the near field communication frontend of the measuring device.

27. The method as in claim 26, wherein the message to the user is an acoustical signal.

28. The method as in claim 24 further comprising:
 via an energy storage device, providing a supply voltage during the measurement during absence of the near field communication magnetic field; and
 during presence of the near field communication magnetic field, charging the energy storage device via the near field communication magnetic field received from the communication device.

29. A system comprising:
 a communication device operative to generate a near field communication magnetic field;
 a measuring device including a chip, the measuring device comprising an RF frontend, a measuring circuit, and a controller circuit;
 the RF frontend being wirelessly coupled to the communication device via the near field communication magnetic field; and
 the controller circuit being operative to transmit a request to the communication device, transmission of the request temporarily switching off the near field communication magnetic field prior to and during a measurement performed by the measuring circuit.

30. The system as in claim 29, wherein the controller circuit is further operative to: i) receive measured values supplied from the measuring circuit, and ii) selectively store the received measured values supplied from the measuring circuit in a repository depending on a status of the near field communication magnetic field at a time when the measured values are generated.

* * * * *